United States Patent
Kim et al.

(10) Patent No.: US 7,053,030 B2
(45) Date of Patent: May 30, 2006

(54) SILICONE HYPER-BRANCHED POLYMER SURFACTANT, METHOD OF PREPARING THE SAME AND METHOD OF RINSING USING A RINSING SOLUTION COMPRISING THE SAME

(75) Inventors: Kyoung-Mi Kim, Anyang-si (KR); Jae-Ho Kim, Yongin-si (KR); Young-Ho Kim, Yongin-si (KR); Sang-Woong Yoon, Seoul (KR); Boo-Deuk Kim, Suwon-si (KR); Shi-Yong Lee, Sungnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 10/780,865

(22) Filed: Feb. 19, 2004

(65) Prior Publication Data

US 2004/0171761 A1     Sep. 2, 2004

(30) Foreign Application Priority Data

Feb. 28, 2003    (KR)   .................. 10-2003-0012825

(51) Int. Cl.
*G03F 7/42*     (2006.01)
(52) U.S. Cl. .................. 510/176; 528/25; 528/31; 528/32; 257/E21.026; 257/E21.492
(58) Field of Classification Search .............. 528/15, 528/31, 321; 556/479
See application file for complete search history.

(56) References Cited

U.S. PATENT DOCUMENTS

| | | | |
|---|---|---|---|
| 6,010,954 A | | 1/2000 | Ho et al. |
| 6,307,081 B1 * | | 10/2001 | Takiuchi et al. ............ 556/434 |
| 2001/0038123 A1 | | 11/2001 | Yu |

OTHER PUBLICATIONS

New Hyperbranched Poly(siloxsilanes): Variation of the Branching Pattern and End-Functionalization authored by Frechet et al. and published in Macromolecules, 1998, 31, 3461-68*

* cited by examiner

*Primary Examiner*—Marc S. Zimmer
(74) *Attorney, Agent, or Firm*—Volentine Francos & Whitt, PLLC

(57) ABSTRACT

A silicone hyper-branched polymer surfactant is included in a rinsing solution which may be used to remove photoresist residues. The silicone hyper-branched polymer surfactant is prepared by polymerizing a monomer represented by the following chemical formula (1), where $R_1$ denotes a vinyl group and $R_2$ denotes hydrogen, and includes both a hydrophobic group and a hydrophilic group

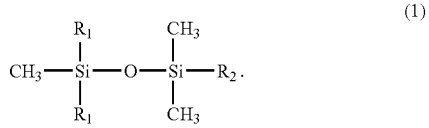

(1)

8 Claims, 3 Drawing Sheets

SILICONE HYPER-BRANCHED POLYMER SURFACTANT, METHOD OF PREPARING THE SAME AND METHOD OF RINSING USING A RINSING SOLUTION COMPRISING THE SAME

BACKGROUND OF THE INVENTION

1. Field of the Invention

The present invention relates to a silicone hyper-branched polymer surfactant which includes both a hydrophobic functional group and a hydrophilic functional group. In addition, the present invention relates to a method of preparing the silicone hyper-branched polymer surfactant, and to a method of rinsing using a rinsing solution including the silicone hyper-branched polymer surfactant.

A claim of priority is made to Korean patent application No. 10-2003-0012825, filed Feb. 28, 2003, the entire contents of which are incorporated herein by reference.

2. Description of the Related Art

Generally, an integrated circuit is manufactured by forming desired circuit patterns on each layer of a chip circuitry using photolithography processes. Photolithography is characterized by the successive processes of exposure, development and etching with respect to a photoresist film formed of a photo-chemically reacting material.

The exposure process is carried out to transfer the pattern of a photo-mask to the photoresist film by passing light through a photo-mask having a desired mask pattern. When the photoresist film is formed of a negative photoresist material, exposed portions of the material undergo a chemical bonding to form a polymer which is less soluble than the non-exposed portions of the film. When the photoresist film is formed of a positive photoresist material, chemical bondings of exposed portions of the material are cleaved into unit molecules which make the exposed portions more soluble then the non-exposed portion. In each case, the photoresist film is patterned by the exposure process into soluble and non-soluble regions.

The developing process is carried out to remove the soluble portions of the photoresist film, with the result being a photoresist pattern formed over a substrate.

Finally, an etching process is implemented using the photoresist pattern as an etch mask to etch a layer formed on the substrate to obtain a desired pattern such as a wiring pattern. Here, the photoresist at the region in which the photochemicalreaction has been caused by the exposure should be completely removed through the developing process, thereby obtaining an accurate pattern of an underlying layer after completing the etching process. However, the photoresist at the region in which the photochemicalreaction has been caused frequently may be not completely removed, and instead residues may remain. This is particularly true in the case of patterns having high aspect ratios which are characteristic of highly integrated semiconductor devices.

Accordingly, a rinsing process is adopted in which deionized water is used as a rinsing solution to remove residual developing solution and the residual photoresist. However, since the residual photoresist is hydrophobic while the rinsing solution is hydrophilic, the residual photoresist may not be completely removed using the rinsing solution of deionized water. That is, the strongly hydrophobic residue is liable to re-attach between patterns during a drying process conducted after the rinsing process. This re-attached residue constitutes an impurity which can adversely impact later processes.

FIGS. 1A and 1B are cross-sectional views of a semiconductor device obtained after implementing a general developing process and a rinsing process.

Referring to FIG. 1A, a photoresist pattern 130 is formed after completing a developing process. Residues 150 that have not been dissolved into a developing solution are formed on the surface portion of an exposed region and a non-exposed region of the photoresist pattern 130, and on the side portion of the photoresist pattern.

Referring to FIG. 1B, the non-dissolved residues 150 precipitate during a rinsing process because of a change of pH of the rinsing solution by deionized water. Accordingly, precipitate 170 is not removed through the rinsing process, but is instead adsorbed on the surface portion of the photoresist pattern to generate an impurity.

Meanwhile, during rinsing of the residues of the photoresist coated on a semiconductor substrate, a tailing and a flowing phenomenon of a partially dissolved photoresist may be generated. Also, during rinsing of residues of the photoresist coated on a semiconductor substrate, a photoresist attack (e.g., partial corrosion of the photoresist) may result when a rinsing solution having a high solubility with respect to a photoresist is utilized. Both tailing and photoresist attack may deteriorate the yield of a semiconductor device.

SUMMARY OF THE INVENTION

It is a first feature of the invention is to provide a silicone hyper-branched polymer surfactant by which hydrophobic photoresist residues can be advantageously removed.

It is a second feature of the present invention is to provide a method of preparing the silicone hyper-branched polymer surfactant obtained by replacing a terminal of a polymer having a hydrophobic siloxane as a main branch with a hydrophilic carboxylic functional group by which photoresist residues can be advantageously removed.

It is a third feature of the present invention is to provide a rinsing solution for a semiconductor device by which photoresist residues can be advantageously removed.

It is a fourth feature of the present invention is to provide a method of rinsing a semiconductor device by which photoresist residues can be easily removed.

In accordance with one aspect of the invention, there is provided a silicone hyper-branched polymer surfactant prepared by polymerizing monomers represented by the following chemical formula (1) and including both of hydrophilic and hydrophobic functional groups.

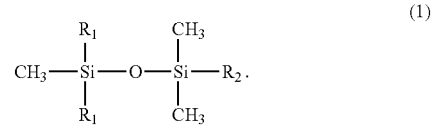

In the chemical formula (1), $R_1$ denotes a vinyl group and $R_2$ denotes hydrogen.

According to another aspect of the invention, dimethyl silanol is prepared through a hydrolysis reaction of dimethyl chlorosilane.

Dimethyl silanol and divinyl chlorosilane react to produce a monomer, methyl divinyl siloxydimethyl silane, as represented by the above chemical formula (1).

The method of preparing a silicone hyper-branched polymer surfactant includes polymerizing the monomer to produce hyper-branched polysiloxane.

In accordance with still another aspect of the invention, a rinsing solution of a semiconductor device includes a silicone hyper-branched polymer surfactant having siloxane prepared by polymerizing monomers. This is represented by the above chemical formula (1) and of which terminal is replaced with a carboxylic functional group as a main structure, along with de-ionized water.

According to still another aspect of the invention, a photoresist pattern is formed on a semiconductor substrate by developing a photoresist film of which a portion is exposed to light to selectively remove the portion of the photoresist film.

Onto the photoresist pattern and the semiconductor substrate, a solution including a silicone hyper-branched polymer surfactant that is prepared by polymerizing monomers represented by the above chemical formula (1) and of which terminal is replaced with a carboxylic functional group as a main structure and de-ionized water, is provided.

By utilizing the silicone hyper-branched polymer surfactant having the carboxylic functional group and the siloxane group, residual developing solution and photoresist remaining on the semiconductor substrate and the photoresist pattern are separated from the semiconductor substrate and the photoresist pattern.

The method of rinsing the semiconductor device includes a step of removing the separated developing solution and the photoresist residues.

Photoresist residues can be cleanly removed by preparing and providing a rinsing solution including a silicone hyper-branched polymer surfactant having both hydrophilic and hydrophobic characteristics onto a semiconductor device.

BRIEF DESCRIPTION OF THE DRAWINGS

The above features and advantages of the present invention will become readily apparent from the detailed description that follows, with reference to the accompanying drawings, in which.

DETAILED DESCRIPTION OF THE PREFERRED EMBODIMENTS

Figure 1A:
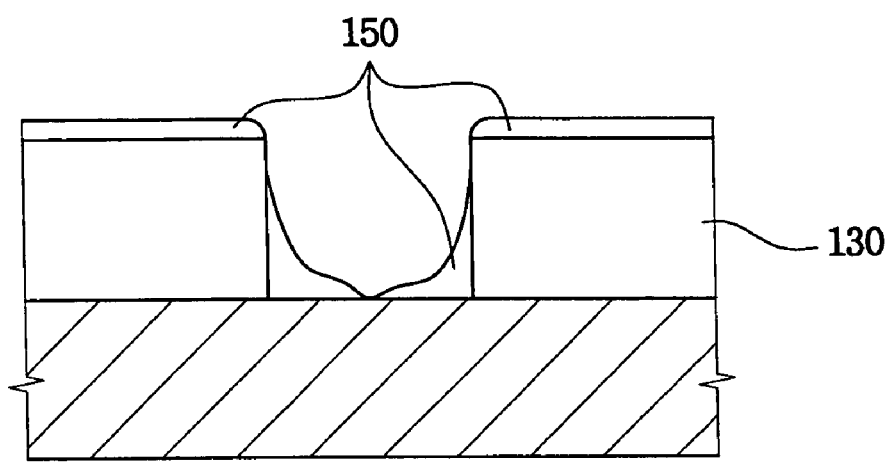
FIGS. 1A and 1B are cross-sectional views of a semiconductor device obtained after implementing a general developing process and a rinsing process.
Figure 1B:
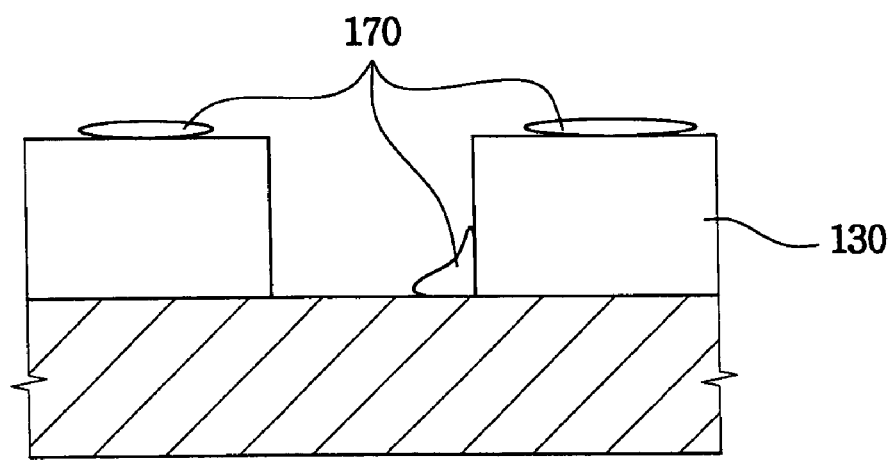

The invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully covey the scope of the invention to those of ordinary skill in the art. In drawings, like reference characters refer to like elements throughout.

According to an embodiment of the invention, a silicone hyper-branched polymer surfactant is provided which includes both of a hydrophobic group and a hydrophilic group through polymerizing monomers as represented by chemical formula (1).

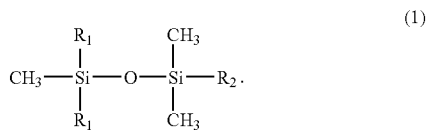

(1)

In the chemical formula (1), $R_1$ indicates a vinyl group and $R_2$ represents hydrogen. The prepared silicone hyper-branched polymer surfactant includes a siloxane group (Si—O) of which terminal is replaced with a carboxyl group (—COOH), as a main structure.

Hereinafter, a method of preparing the silicone hyper-branched polymer surfactant will be described.

Di-methyl chlorosilane is provided as a starting material, and the di-methyl chlorosilane is hydrolyzed to produce di-methyl silanol.

To prepare the di-methyl silanol, di-methyl chlorosilane is added into a vessel including tetrahydrofuran (THF) solvent and then stirred to obtain a mixture solution. Into the obtained mixture solution, tri-acyl amine is added and dissolved and then, drops of de-ionized water are added. These processes are carried out within an ice bath to maintain an appropriate temperature.

The prepared di-methyl silanol is added into a THF solution along with divinyl methyl chlorosilane with a molar ratio of 1:1, simultaneously. The reacted product is methyl divinyl siloxy dimethyl silane, which is an $AB_2$ type monomer and represented by the above chemical formula (1), which is reproduced below.

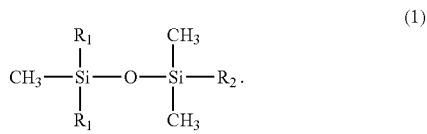

(1)

In the chemical formula of (1), $R_1$ represents a vinyl group and $R_2$ indicates hydrogen. Again, the reaction processes are carried out within an ice bath to maintain an appropriate reaction temperature.

The monomer is polymerized by means of a hydrosilylation method using a platinum catalyst. Here, the polymerization reaction is carried out while stirring within the THF solvent at room temperature (about 25° C.) for about 30 minutes.

Into the thus obtained polymer produced by the hydrosilylation method for about 30 minutes, $HBBr_2$—$SCH_3$ is provided. Then, de-ionized water is provided, and $CrO_3$, AcOH and de-ionized water are continuously provided to replace the terminal of the polymer with a carboxyl group. These serial processes subsequently proceed within one vessel while stirring for a predetermined time period. At last, hyper-branched polysiloxysilane having siloxane as a main backbone and a carboxyl group at the terminal portion thereof is prepared.

A rinsing solution is prepared using the hyper-branched polysiloxane as a surfactant. This rinsing solution includes the surfactant of the hyper-branched polysiloxane and de-ionized water.

The prepared rinsing solution is utilized in a rinsing process during manufacturing of a semiconductor device.

Hereinafter, a method of forming a resist film pattern will be described.

A photoresist is coated to form a photoresist film over a semiconductor substrate. Here, the substrate may include one or more insulation layers and/or one or more conductive layers formed over a main surface thereof.

An exposing process is implemented to define a pattern within the photoresist film by photochemical reaction.

Next, the photoresist film is developed to selectively remove portions of the photoresist film to obtain a photoresist film pattern over the substrate.

After development, the photoresist film pattern is subjected to a rinsing process so as to remove any remaining developing solution and photoresist residues.

In order to perform the rinsing process, the rinsing solution of the present invention is provided onto the semiconductor substrate on which the photoresist pattern is formed. Due to the surfactant of hyper-branched polysiloxysilane included in the rinsing solution, the remaining of developing solution and of photoresist residues on the semiconductor substrate and the photoresist film pattern are easily separated from the semiconductor substrate and the photoresist film pattern.

Figure 2A:
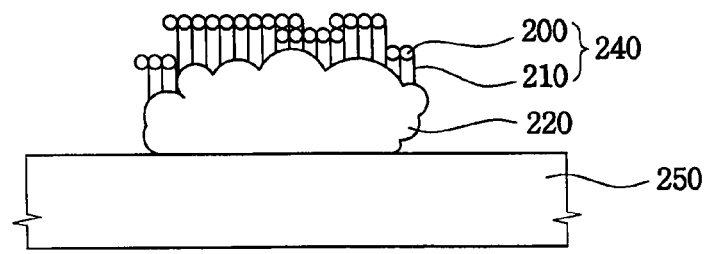
FIGS. 2A to 2C are schematic diagrams for explaining a method of removing photoresist residues according to a preferred embodiment of the present invention.
Figure 2B:
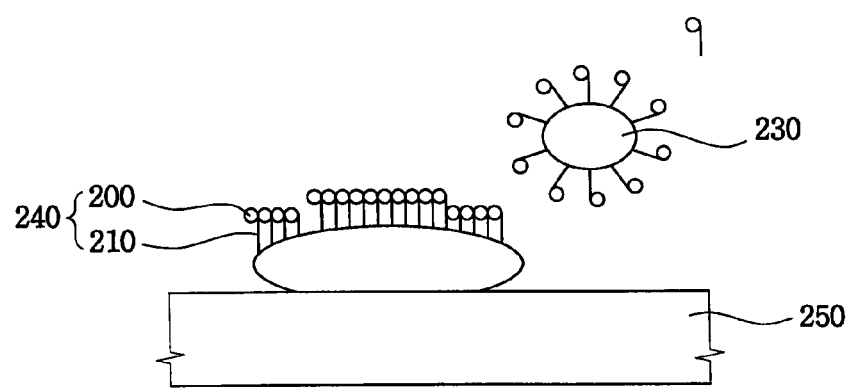
Figure 2C:
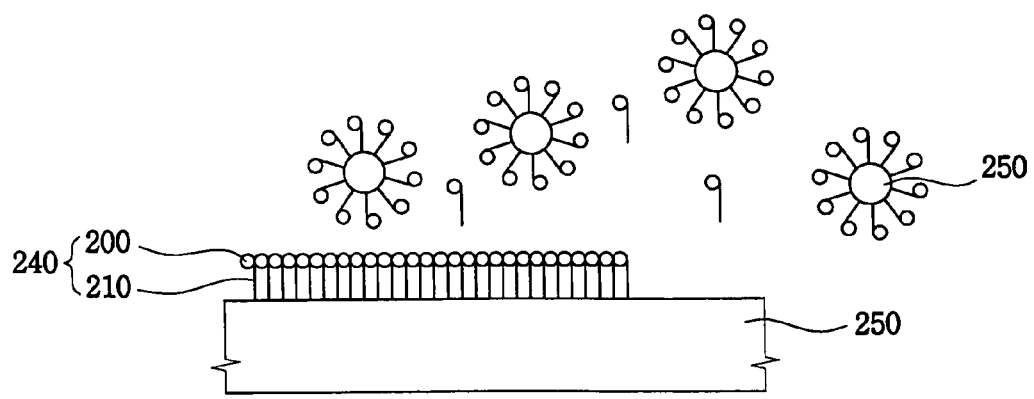

FIGS. 2A to 2C are schematic diagrams for explaining a method of removing photoresist residues according to an embodiment of the invention.

Referring to FIG. 2A, hyper-branched polysiloxysilane 240 includes a hydrophilic group of a carboxyl group 200 and a hydrophobic group of siloxane 210. That is, hyper-branched polysiloxysilane 240 includes two conflicting properties of a hydrophilic property and a hydrophobic property within a molecule.

Therefore, hyper-branched polysiloxysilane can be dissolved into de-ionized water very well, and it can also penetrate into the photoresist residue 220 having the hydrophobic property to be adsorbed.

Referring to FIG. 2B, hyper-branched polysiloxysilane 240 is readily dissolved into the two solvents. Therefore, this compound can be readily adsorbed onto the surface of the photoresist residues 220 while being dissolved into the de-ionized water, to substantially lower a free energy at an interface. At last, the photoresist residues can be separated from the semiconductor substrate 250 and thus, separated photoresist residues 230 can be isolated within the de-ionized water.

Referring to FIG. 2C, hyper-branched polysiloxysilane has both properties of the hydrophilicity and the hydrophobicity. Accordingly, hyper-branched polysiloxysilane surrounds the separated photoresist residue 230 to disperse the residue into the de-ionized water. That is, a re-adsorption of the separated photoresist residues onto the semiconductor substrate can be prevented.

Generally, carbohydrate-based or alcohol-based solvents are flammable and explosive. In contrast, silicone-based surfactant is stable as to heat and has a good penetrating property. In addition, the silicone-based surfactant is rarely toxic and has a strong cleansing power onto hydrophobic impurities.

According to the invention, photoresist residues can be advantageously separated from the semiconductor substrate in de-ionized water by using a silicone hyper-branched polymer surfactant of which terminal is replaced with a carboxyl group. Thus, separated developing solution and photoresist residues are removed.

EXAMPLE 1

Process of Manufacturing Surfactant

Preparation of di-methyl silanol

To prepare di-methyl silanol, di-methyl chlorosilane (manufactured by Aldrich Co.) was added into a vessel including tetrahydrofuran (THF) solvent, and then stirred to obtain a mixture solution. Tri-acyl amine (manufactured by Aldrich Co.) was added and dissolved into the obtained mixture solution, and then de-ionized water was dropwisely added to thereby obtain di-methyl silanol. Here, the above processes were carried out within an ice bath to maintain an appropriate temperature, for example about 0° C.

Preparation of Divinyl Siloxy Dimethyl Silane

The prepared di-methyl silanol was added into a THF solution along with divinyl methyl chlorosilane with a molar ratio of about 1:1, simultaneously. The reacted product was methyl divinyl siloxy dimethyl silane, which was an $AB_2$ type monomer and represented by previously described chemical formula (1), reproduced below.

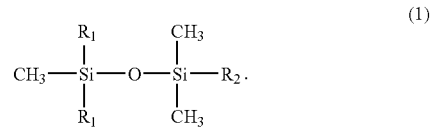

(1)

In the chemical formula (1), $R_1$ represents a vinyl group and $R_2$ indicates hydrogen. All of the reaction processes were carried out within an ice bath to maintain an appropriate reaction temperature.

Preparation of Surfactant

The monomer was polymerized by means of a hydrosilylation method using a platinum catalyst. Here, the polymerization reaction was carried out while stirring within the THF solvent at room temperature (about 25° C.) for about 30 minutes.

Into the thus obtained polymer produced by the hydrosilylation method for about 30 minutes, $HBBr_2$—$SCH_3$ was provided. Then, de-ionized water was provided, and $CrO_3$, AcOH and de-ionized water were continuously provided to replace the terminal of the polymer with a carboxyl group. These serial processes were subsequently performed within one vessel while stirring for a predetermined time period. Finally, hyper-branched polysiloxysilane having siloxane as a main backbone and a carboxyl group at the terminal portion thereof was prepared.

EXAMPLE 2

Process of Manufacturing Rinsing Solution

A rinsing solution was prepared using the hyper-branched polysiloxane as a surfactant. This rinsing solution included the surfactant of the hyper-branched polysiloxane and de-ionized water.

EXAMPLE 3

Rinsing a Semiconductor Device

A photoresist film having a thickness of about 400 nm was formed on a semiconductor substrate. The photoresist film was exposed to light using a photo-mask having a line width of about 110 nm and an interval of about 110 nm. The exposed photoresist film was developed to form a photoresist film pattern. The obtained semiconductor device on which the photoresist film pattern was formed, was provided as a sample. Onto the sample, a rinsing solution including hyper-branched polysiloxysilane and de-ionized water was provided to remove developing solution and photoresist residues remaining on the semiconductor substrate and the photoresist film pattern. The rinsed sample was dried.

Comparative Example

A photoresist film having a thickness of about 400 nm was formed on a semiconductor substrate. The photoresist film was exposed to light using a photo-mask having a line width of about 110 nm and an interval of about 110 nm. The exposed photoresist film was developed to form a photoresist film pattern. The obtained semiconductor device on which the photoresist film pattern was formed, was provided as a sample. Onto the sample, a rinsing solution including de-ionized water was provided to remove developing solution and photoresist residues remaining on the semiconductor substrate and the photoresist film pattern. The rinsed sample was dried.

Test on Removal of Photoresist Residues According to Rinsing Solutions

Semiconductor device samples rinsed and obtained through the Example 3 and the Comparative Example were analyzed by taking a cross-sectional photograph of the samples. Results are illustrated in the following Table 1.

TABLE 1

|  | Upper CD (nm) | Lower CD (nm) | Substrate contact CD (nm) | Gradient (°) | Loss degree (%) |
|---|---|---|---|---|---|
| Example 3 | 116 | 134 | 144 | 87.7 | 1.7 |
| Comparative Example | 151 | 182 | 234 | 86 | 1.6 |

Referring to Table 1, the degree of the loss of the photoresist film pattern is from about 1.6% to about 1.7% based on the total height of the photoresist film pattern in the Example 3 and the Comparative Example. Accordingly, from the result, it is known that photoresist film pattern is not damaged both in the Example 3 and the Comparative Example.

Figure 3A:
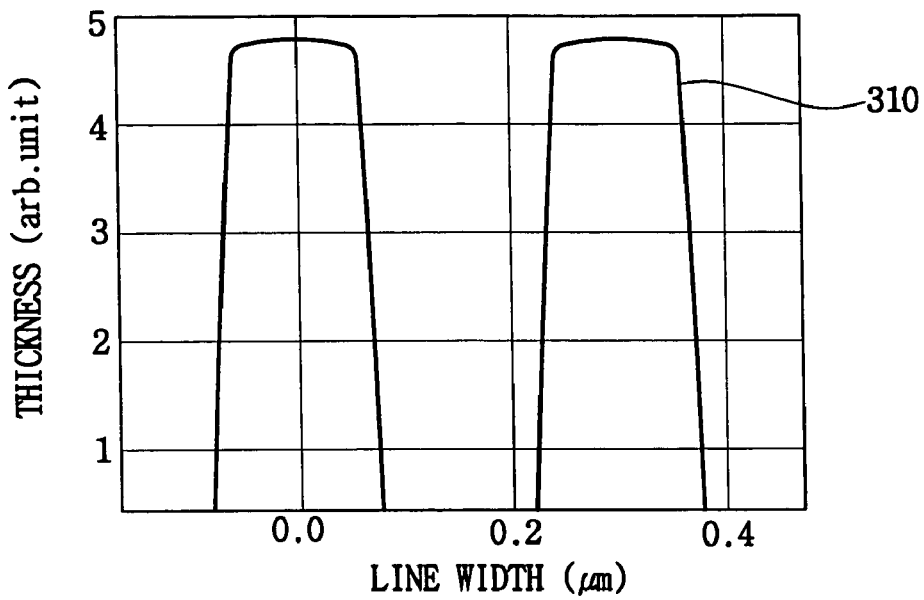
FIG. 3A is a cross-sectional view of a photoresist pattern obtained by an Example 3 of the present invention.

FIG. 3A is a cross-sectional view illustrating a photoresist pattern obtained by an embodiment of the invention.

Referring to Table 1 and FIG. 3A, the upper critical dimension (CD) of the first photoresist pattern 310 is about 116 nm and the lower critical dimension of the first photoresist pattern 310 is about 134 nm. Also, the critical dimension at an interface of the first photoresist pattern 310 and the semiconductor substrate is about 144 nm. A gradient measured at the side portion of the first photoresist pattern 310 is about 87.7°.

Figure 3B:
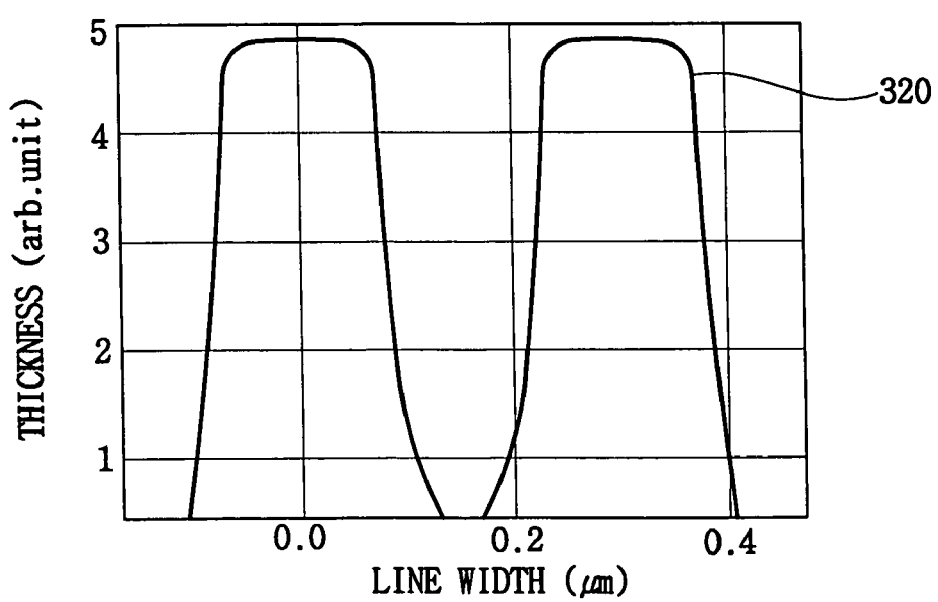
FIG. 3B is a cross-sectional view of a photoresist pattern obtained by a Comparative Example in the present invention.

FIG. 3B is a cross-sectional view showing a photoresist pattern obtained by the Comparative Example.

Referring to FIG. 3B, the upper critical dimension of the second photoresist pattern 320 is about 151 nm and the lower critical dimension of the second photoresist pattern 320 is about 182 nm. Also, the critical dimension at an interface of the second photoresist pattern 320 and the semiconductor substrate is about 234 nm. A gradient measured at the side portion of the second photoresist pattern 320 is about 86°.

The upper critical dimension of the photoresist pattern formed according to the Example 3 is larger by about 30% or more than that of the photoresist pattern formed according to the Comparative Example. In addition, the lower critical dimension of the photoresist pattern formed according to the Example 3 is larger by about 35% or more than that of the photoresist pattern formed according to the Comparative Example. Further, the critical dimension at the interface of the photoresist film pattern formed according to the Example 3 and the semiconductor substrate is larger by about 62.5% or more than that of the photoresist pattern formed according to the Comparative Example. That is, the width of the photoresist pattern rinsed according to the Example 3 is larger than that of the photoresist pattern rinsed according to the Comparative Example. According to thus obtained result, a rinsing effect of the rinsing solution including hyper-branched polysiloxysiloxane can be confirmed.

When the removal of the photoresist residues is implemented using the rinsing solution including the silicone hyper-branched polymer surfactant, the critical dimension of the photoresist pattern at the upper portion is not increased.

In contrast, when the removal of the photoresist residues is implemented by using the rinsing solution including only de-ionized water, the photoresist residues remain on the photoresist pattern as an adsorbed shape and the critical dimension of the photoresist pattern at the upper portion is increased.

Accordingly, the gradient at the side portion of the photoresist pattern formed by the Comparative Example is smaller by about 1.7° than that of the photoresist pattern formed by the Example 3, due to the photoresist residues present between the patterns. When the gradient at the side portion becomes small, the slope of the photoresist pattern becomes gentle and the width of the photoresist pattern is increased due to the residues. Therefore, a stable pattern gap cannot be confirmed. When an underlying layer is patterned utilizing the thus formed photoresist pattern, a pattern having a desired width cannot be formed. In addition, the residues become an impurity during implementation of a subsequent etching process to lower an etching stability.

As described above, a silicone hyper-branched polymer surfactant including both hydrophobicity and hydrophilicity is prepared by polymerizing monomers of $AB_2$ type of which backbone is siloxane, and then replacing the terminal of thus prepared polymer with a carboxylic group.

A polymer having both of hydrophobicity and hydrophilicity can be prepared by replacing a terminal of a hydrophobic polymer with a hydrophilic group.

The hyper-branched polymer having a large number of branches and terminal groups can be prepared through a simple polymerizing method. Therefore, the number of the hydrophilic groups and the hydrophobic groups can be substantially increased within one molecule other than general linear polymer. Thus, a function as a surfactant may be effectively obtainable.

When a rinsing solution is obtained by adding the surfactant into a general rinsing solution, the generation of an impurity due to photoresist residues possibly remaining after implementing a developing process and a rinsing process can be effectively prevented.

Although the preferred embodiments of the invention have been described, it is understood that the present invention should not be limited to these preferred embodiments but various changes and modifications can be made by one skilled in the art within the spirit and scope of the invention as hereinafter claimed.

What is claimed is:

1. A silalkylene-siloxane hyper-branched polymer surfactant prepared by polymerizing monomers represented by a chemical formula (1) and including a hydrophobic group and a hydrophilic group;

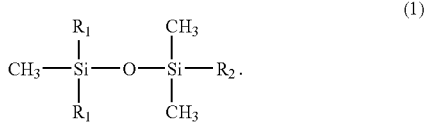

where $R_1$ denotes a vinyl group and $R_2$ denotes hydrogen, and wherein the monomer is polymerized by polymerizing the monomer using a catalyst and a hydrosilylation method, and replacing a terminal of the polymer with a carboxyl group.

2. The silalkylene-siloxane hyper-branched polymer surfactant as claimed in claim 1, wherein silalkylene-siloxane of which a terminal is replaced with a carboxyl group, is a backbone of the silalkylene-siloxane hyper-branched polymer surfactant.

3. A method of preparing a silalkylene-siloxane hyper-branched polymer surfactant, comprising;
   preparing dimethyl silanol by hydrolyzing dimethyl chlorosilane;
   preparing a monomer represented by a chemical formula (1) of methyl divinyl siloxy dimethyl silane by reacting dimethyl silanol with divinyl methyl chlorosilane,

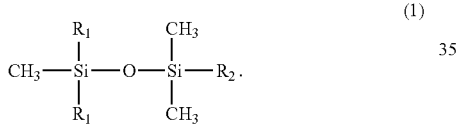

where $R_1$ denotes a vinyl group and $R_2$ denotes hydrogen; and
   preparing hyper-branched polysiloxy silane by polymerizing the monomer,
   wherein the monomer is polymerized by polymerizing the monomer using a catalyst and a hydrosilylation method, and replacing a terminal of the polymer with a carboxyl group.

4. The method of claim 3, wherein the dimethyl silanol and divinyl chlorosilane are reacted with each other at about a 1:1 molar ratio.

5. The method of claim 5, wherein the catalyst includes platinum.

6. The method of claim 3, wherein the polymerizing is carried out using the $R_1$ and $R_2$ group of the monomer as reacting groups.

7. A rinsing solution comprising a silalkylene-siloxane hyper-branched polymer surfactant prepared by polymerizing a monomer represented by a chemical formula (1) and de-ionized water, the surfactant including silalkylene-siloxane of which a terminal is replaced with a carboxyl group as a main backbone;

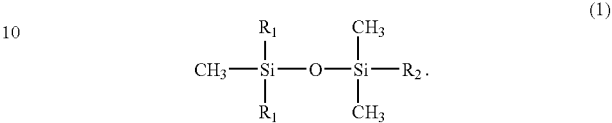

where $R_1$ denotes a vinyl group and $R_2$ denotes hydrogen, and wherein the monomer is polymerized by polymerizing the monomer using a catalyst and a hydrosilylation method, and replacing a terminal of the polymer with a carboxyl group.

8. A method of rinsing a semiconductor device comprising:
   forming a photoresist pattern on a semiconductor substrate by selectively exposing a photoresist film and then developing the photoresist film to selectively remove portions of the photoresist film;
   providing a solution onto the photoresist pattern and the semiconductor substrate, where the solution includes (a) a silalkylene-siloxane hyper-branched polymer surfactant which includes silalkylene-siloxane of which a terminal is replaced with a carboxyl group as a main backbone, the surfactant being prepared by polymerizing a monomer represented by a chemical formula (1) and (b) de-ionized water,

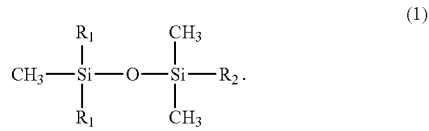

wherein, $R_1$ denotes a vinyl group and $R_2$ denotes hydrogen, wherein the monomer is polymerized by polymerizing the monomer using a catalyst and a hydrosilylation method, and replacing a terminal of the polymer with a carboxyl group;
   using the solution to separate a developing solution and photoresist residues which remain on the semiconductor substrate and the photoresist pattern from the semiconductor substrate and the photoresist pattern; and
   removing the separated developing solution and the photoresist residues.

* * * * *